United States Patent [19]
Fox

[11] Patent Number: 5,116,444
[45] Date of Patent: May 26, 1992

[54] APPARATUS AND METHOD FOR ENHANCING LAMINATION OF PLASTIC FILMS

[75] Inventor: John G. Fox, Hawthorne, N.J.

[73] Assignee: Sealed Air Corporation, Saddle Brook, Del.

[21] Appl. No.: 707,675

[22] Filed: May 30, 1991

[51] Int. Cl.⁵ .................. B29C 47/06; B32B 31/24
[52] U.S. Cl. .................. 156/244.17; 156/244.23; 156/244.24; 156/272.2; 156/272.6; 156/273.1; 156/379.6; 156/379.8; 156/500
[58] Field of Search .............. 156/244.11, 244.17, 156/272.2, 272.6, 273.1, 379.6, 379.8, 500, 244.23, 244.24

[56] References Cited

U.S. PATENT DOCUMENTS

| | | |
|---|---|---|
| 3,142,599 | 7/1964 | Chavannes . |
| 3,171,539 | 3/1965 | Holbrook et al. . |
| 3,196,063 | 7/1965 | Pequin et al. ............ 156/244.17 |
| 3,208,898 | 9/1965 | Chavannes et al. . |
| 3,285,793 | 11/1966 | Chavannes . |
| 3,294,387 | 12/1966 | Chavannes . |
| 3,323,965 | 6/1967 | Hanle et al. ............ 156/244.17 |
| 3,405,020 | 10/1968 | Chavannes . |
| 3,415,711 | 12/1968 | Chavannes . |
| 3,535,588 | 10/1970 | Crook . |
| 3,575,793 | 4/1971 | Paisley . |
| 3,735,198 | 6/1973 | Barnett et al. . |
| 3,820,929 | 6/1974 | Busby et al. . |
| 4,111,625 | 9/1978 | Remmington et al. . |
| 4,244,894 | 1/1981 | Segransan et al. . |
| 4,594,203 | 6/1986 | Hagiwara et al. . |
| 4,778,557 | 10/1988 | Schirmer . |
| 4,898,638 | 2/1990 | Lugz . |
| 4,997,600 | 3/1991 | Okumaura et al. . |

FOREIGN PATENT DOCUMENTS 25378 2/1980 Japan .................... 156/244.17

OTHER PUBLICATIONS

Chargemaster ® Product Information Sheet, by SIMCO ®.

*Primary Examiner*—Caleb Weston
*Attorney, Agent, or Firm*—Bell, Seltzer, Park & Gibson

[57] ABSTRACT

A method and apparatus for enhancing the lamination of two plastic films on a rotating embossing roll or other roll. Two films are extruded and brought into contact on the rotating roll. An electrode and power supply generate an electrostatic field to press the outer plastic film into intimate contact with the inner plastic film. The electrode is positioned in a spaced apart relation from the roll where the two plastic films are brought together. The electrode may be positioned in a protective housing. Positive air pressure may be maintained in the housing to reduce the accumulation of smoke and contaminants on the electrode. The electrode may also be positioned on retractable mount which allows the electrode to be retracted from its normal operating position and readily cleaned.

16 Claims, 2 Drawing Sheets

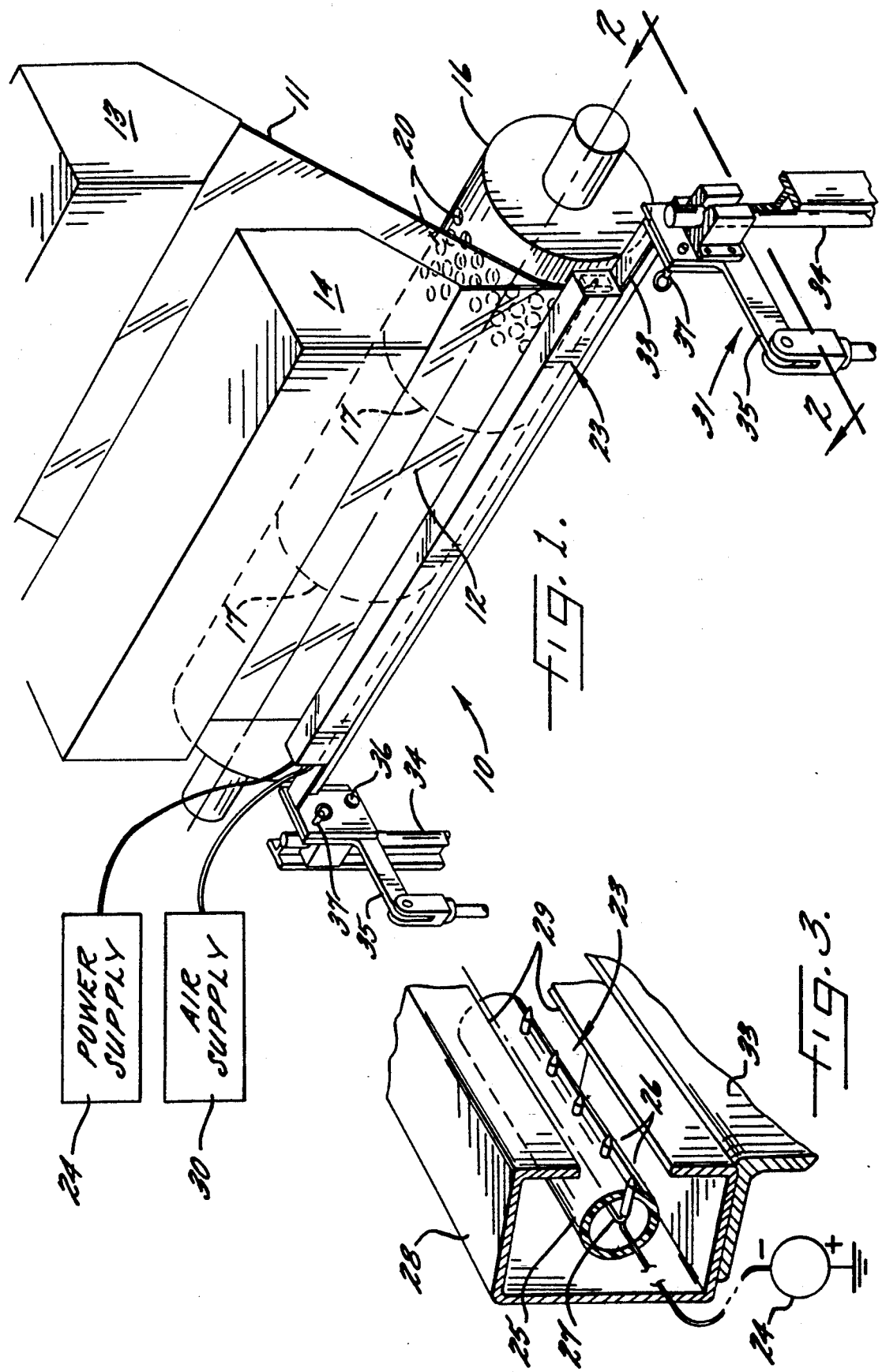

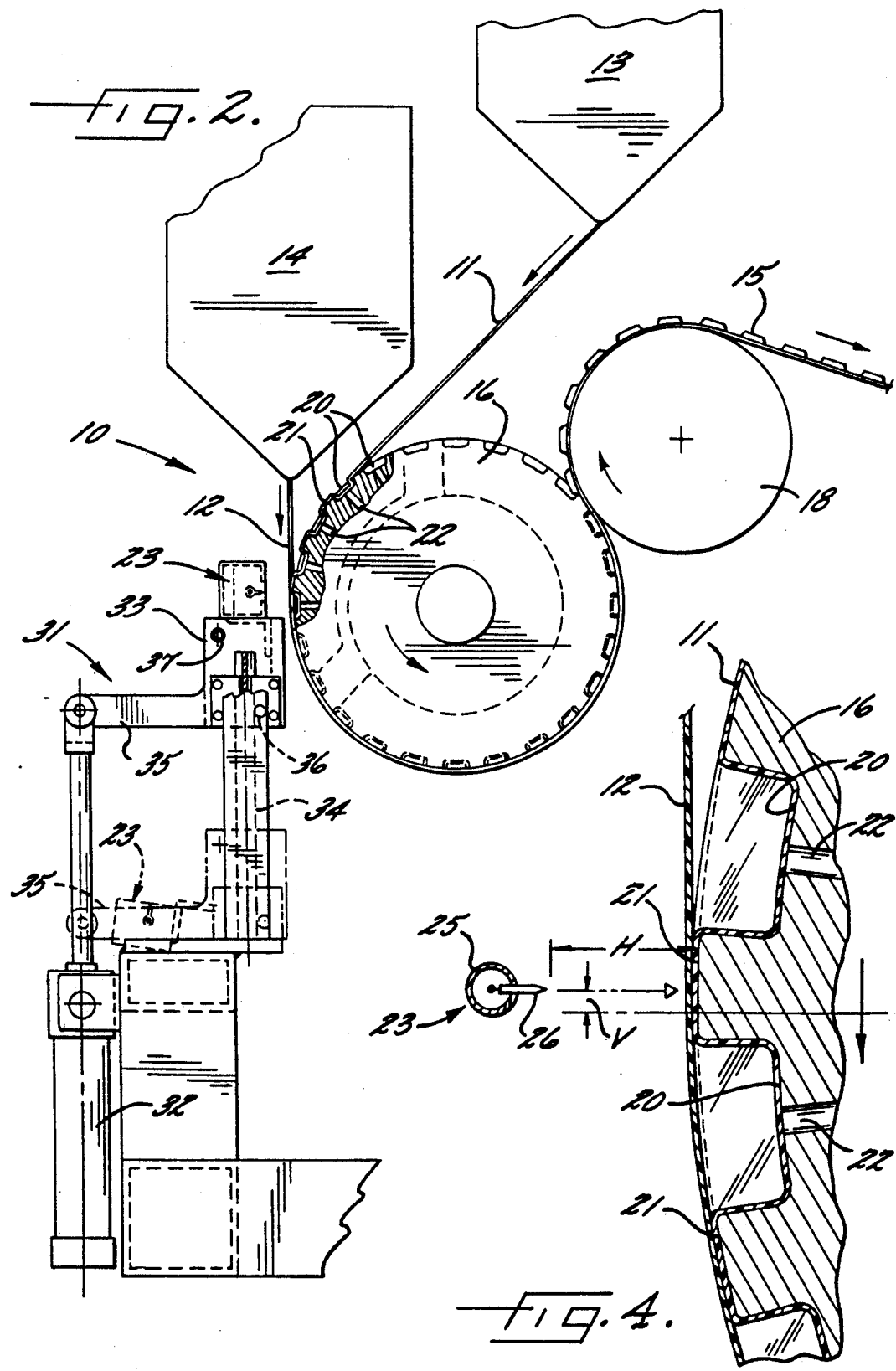

APPARATUS AND METHOD FOR ENHANCING LAMINATION OF PLASTIC FILMS

FIELD OF THE INVENTION

The present invention relates to the field of making plastic laminates, and more particularly, to an apparatus and method using an electrostatic field to enhance the lamination of two plastic films.

BACKGROUND OF THE INVENTION

It is well known that two thermoplastic films may be extruded and laminated together forming trapped air pockets or cells. For example, U.S. Pat. No. 3,142,599 to Chavannes and assigned to the assignee of the present invention, discloses such laminated cellular cushioning material. A first extruded film is brought into contact with an embossing roll typically having a pattern of cavities and lands formed in the outer surface thereof. To enhance conformance of the plastic film with the cavities, each cavity typically includes a opening through which suction may be applied to draw the plastic material down into the cavity as shown, for example, in U.S. Pat. No. 3,208,898 also assigned to the assignee of the present invention.

A second film is then extruded and brought into contact with the first film. The two films fuse ether adjacent the land portions of the embossing roll trapping pockets of air therebetween. The cellular laminate thus formed is widely used as cushioning material for packaging products for protection during shipping and storage.

To ensure adequate mechanical contact between the first and second plastic films where they are brought into mutual contact on the embossing roll, a nip roll assembly is commonly used. The nip roll assembly includes a nip roll positioned opposite the embossing roll so as to physically contact and press the two films together on the embossing roll. The plastic films have a relatively high temperature at the contact point. Accordingly, the nip roll must contact the relatively hot plastic film yet release the film upon further rotation. Typically, the nip roll has a Teflon covering so that the hot plastic film does not adhere to the roll and result in continuous wrapping of the film around the roll. Unfortunately, the service life of the nip roll and Teflon covering is relatively short. In addition, the nip roll assembly must typically include an auxiliary cooling roll for cooling the surface of the Teflon and to minimize deflection of the nip roll against the embossing roll.

Any repair or recovering of the Teflon surface of the nip roll necessitates manufacturing production downtime while the roll is being changed out. In addition, such repair or replacement is often relatively expensive. For example, because of the unique design of the Teflon covered nip roll, the replacement cost may exceed several thousands of dollars per roll. Durability of a repaired or recovered nip roll is unclear at best. The range is typically somewhere between one day and three months. Temporary short term repairs are often done, but can adversely affect the cellular product. To simply replace the cover is also relatively expensive, even excluding the cost of production downtime.

The opposing nip roll often does not provide consistent quality—leaving gaps in the lamination so that air transfers between adjacent cells or bubbles, for example. The embossing rolls are also typically formed of several cylindrical sections which are positioned in end-to-end relation. Unfortunately, adjacent sections may not be in perfect alignment. Any imperfection in the alignment at the joints between adjacent sections is also likely to yield inconsistent lamination. Heavy gauge extrudate may mask any irregularities at the joints between adjacent sections; however, for light gauge extrudate, the irregularities may be exaggerated, thereby producing an unacceptable product. Cell-to-cell air transfer may be evident along the portion of the laminate formed at the section joints, thereby reducing the cushioning effect of the cellular laminate. Softer roll coverings and other materials have been tried on the nip roll, but all have failed as a result of the extreme heat from the plastic films.

In other plastic film production processes it is known to impress an electrostatic charge onto a single extruded plastic film to cause the film to be drawn into contact with an electrically grounded cooling, or quenching, roll. For example, U.S. Pat. No. 4,111,625 to Remmington et al., discloses an apparatus for applying an electrostatic charge to a single molten plastic film to "pin" the film to a rotating quenching drum. The electrostatic charge is applied by a wire electrode extruding transversely across the single molten film and parallel to the axis of the quenching drum. Similarly, U.S. Pat. No. 4,594,203 to Hagiwara et al. discloses a system in which the contact area of the single film and the quenching roll is maintained in a gas atmosphere having a higher electrical resistance than air to thereby prevent premature discharge of the electrostatic charge from the film to the quenching roll. Unfortunately, these pinning systems do not address lamination of two or more plastic films. Rather, they disclose that an electrostatic charge must first be applied to the single film, then the charged single film drawn into contact with the grounded metal quenching roll by electrostatic attraction.

It is known in the related field of forming plastic laminates that an electrical corona discharge may be used to treat chemically the surface of two or more films to assist in laminating the films together. The corona discharge treatment causes oxidation and other changes to the surface of the plastic film. U.S. Pat. No. 4,778,557, for example, discloses a laminating apparatus using such a corona discharge treatment of plastic films. It is preferred, however, that plastic cellular laminates are formed by heat fusion of the two plastic films together. Heat fusion forms a strong and secure bond between the two films of the laminate as required to prevent cell-to-cell transfer of air to provide consistent cushioning properties.

Despite continuing efforts to improve the performance of a conventional Teflon covered nip roll and to extend its useful service life, the nip roll is expensive to purchase and maintain and still frequently causes quality problems, such as cell-to-cell transfer of air. The electrostatic charge pinning of a single sheet to a quenching roll, or corona treatment of two films, do not address lamination of two films to form cellular laminates.

SUMMARY OF THE INVENTION

It is therefore an object of the present invention to provide an apparatus and method for enhancing the lamination between two plastic films, such as for the production of a cellular laminate.

It is another object of the present invention to provide an apparatus and method for forming a high quality cellular laminate on a rotating embossing roll despite imperfections in alignment at the joints between adjacent sections of the roll.

It is a further object of the present invention to provide an apparatus for enhancing lamination between two plastic films which is relatively inexpensive and which requires little maintenance compared to prior nip rolls.

These and other objects of the present invention are provided by a laminating apparatus which includes an embossing roll having a pattern of cavities and lands on an outer surface portion. The embossing roll is driven at a predetermined speed by conventional drive means, such as an electric motor. A first extruder extrudes a first plastic film onto the rotating embossing roll. Openings are typically provided in each of the cavities. The openings are connected to a vacuum source which draws the hot plastic film into conformance with the cavities.

A second extruder extrudes a second, or outer, plastic film in superposed contacting relation with the first, or inner, plastic film on the rotating roll. The two films contact on the lands of the rotating embossing roll and the films are heat fused or laminated together. When used for forming a cellular cushioning laminate, air fills the volume between the two films corresponding to the pattern of cavities in the embossing roll. As would be readily understood by those having skill in the art, other gases or materials may be positioned within the cells formed between the two plastic films.

Means are provided for generating an electrostatic field opposite the embossing roll adjacent the area where the outer plastic film contacts the inner film. It is theorized that the electrostatic field repels the outer plastic film thereby forcing it into intimate contact with the inner plastic film on the lands of the rotating embossing roll. The means for generating the electrostatic field preferably includes a high voltage electrical power source and an elongate electrode positioned in a spaced apart relation from the embossing roll and the outer plastic film. The electrode provides the needed backing pressure to the outer plastic film to ensure contact with the inner plastic film. The electrostatic field presses the outer plastic film into intimate contact with the inner film so that a high quality cellular laminate is formed despite imperfections in alignment at the joints between adjacent sections of the embossing roll. In addition, since the electrode does not contact the hot plastic film, the electrode has a reasonably long expected service life and requires little maintenance other than periodic cleaning.

The electrode preferably includes an elongate metal tube having a plurality of outwardly extending pins for concentrating the electrostatic field toward the outer plastic film. Each of the pins is connected to the high voltage power supply. The electrode may be mounted on a retractable mount so that it may be moved between an operating position, about an inch or so from the outer film, to a retracted position away from the embossing roll to allow for cleaning of the electrode surface.

A protective housing is preferably provided around the electrode. The housing includes an elongate slot parallel to the electrode and adjacent the embossing roll. The housing may be connected to a pressurized air supply for providing a slight positive pressure within the housing. The positive air pressure reduces the accumulation of smoke and other contaminants on the electrodes which are typical in the vicinity of the hot plastic films.

While the present invention is particularly directed to the problem of providing backing pressure to the outer film for forming cellular laminate with an embossing roll, it would be readily understood by those having skill in the art that the present invention may be used in other plastic film laminating processes. For example, a rotating roll without cavities may be used according to the present invention, whereby the lamination of the two films may be enhanced by pressing the outer film onto the inner film using an electrostatic field generated by a high voltage electrode.

BRIEF DESCRIPTION OF THE DRAWINGS

FIG. 1 is a perspective, partial schematic view of the apparatus according to the present invention.

FIG. 2 is an enlarged side elevational view, with portions shown in section, taken along the lines 2—2 in FIG. 1.

FIG. 3 is an enlarged fragmentary perspective view, partially in section, of the electrode and housing of the present invention.

FIG. 4 is an enlarged fragmentary sectional view of the electrode and roll shown in FIG. 2 further illustrating the positioning of the electrode with respect to the roll.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein. Rather, applicant provides this embodiment so that this disclosure will be thorough and complete, and will fully convey the scope of the invention to those skilled in the art.

The present invention is an apparatus and method for enhancing the lamination of plastic films. The laminating apparatus according to the present invention is generally designated as 10 in the accompanying drawings. The laminating apparatus 10 is illustrated for forming a laminated cellular cushioning material 15. As would be readily understood by those skilled in the art, the present invention may be used for forming other laminated films as well.

Referring to FIGS. 1 and 2, there is shown the laminating apparatus 10 including an embossing roll 16 and conventional drive means associated therewith, not shown. The drive means may be an electric motor, for rotating the embossing roll 16 at a predetermined speed. The embossing roll 16 may typically operate at a speed of from 100 to 350 feet per minute. The embossing roll 16 typically has an axial length of about 60 inches and may be formed from several cylindrical sections arranged in end-to-end relation, forming joints 17 therebetween. A stripping roll 18 may also be provided to strip the cellular laminate 15 from the embossing roll 16. As would be readily understood by those skilled in the art, the stripper roll 18 may also be cooled to help cool the hot cellular laminate 15.

The laminating apparatus 10 includes first and second extruding means for extruding the first plastic film 11 and second plastic film 12 to be laminated. The plastic films 11, 12, are typically polyethylene. The first and second extruding means may be a conventional top die 13 and bottom die 14, respectively, as shown in the illustrated embodiment. The first plastic film 11 is brought into contact on the outer surface of the embossing roll 16. The embossing roll 16 includes a pattern of cavities 20 with lands 21 therebetween. The embossing roll 16 typically includes openings 22 (FIGS. 2 and 4) in each of the cavities 20 which are connected to a vacuum source, not shown. The vacuum draws the first plastic film 11 into conformance with the cavities 20.

The bottom die 14 produces a second plastic film 12 which is brought into superposed contacting relation With the first plastic film 11 on the lands 21 of the embossing roll 16. In the prior art, backing pressure to the second 12 plastic film was provided with a rotating nip roll typically having a Teflon or other non-stick surface covering. The present invention provides the needed backing pressure to the second film 12 by an electrostatic field generating means being positioned in a non-contacting relation to the second film 12 near the point where the second film 12 contacts the first film 11.

The electrostatic field generating means preferably includes an elongate electrode 23 positioned in a spaced apart relation from the second plastic film 12. A source of high voltage electrical power 24 is connected to the electrode 23. The power source 24 is preferably a variable voltage DC power supply connected at the positive terminal (+) to an electrical ground, with the negative terminal (−) being connected to the electrode 23. It is theorized that the electrostatic field created repels, or pushes, the second plastic film 12 into intimate contact with the first plastic film 11 over the land areas 21 of the embossing roll 16. The lower source 24 may typically be operated at about 30,000 volts during normal operation. During initial start-up of the laminating apparatus 10, the power source 24 may be operated at about 50% of the normal operating voltage. The voltage may be adjusted according to a predetermined value, or may be determined empirically by periodically taking and inspecting samples of the laminate 15. As would be readily understood by those skilled in the art the desired operating voltage may also be affected by the size of the cells formed in the laminate 15 and other factors.

Because the electrode 23 does not contact the heated plastic film 12, it is not readily contaminated by the hot plastic material as was the contacting nip roll of the prior art. In addition, the electrode 23 provides a sufficiently high electrostatic force to the second film 12 to press the films 11, 12, into intimate contact on the lands 21 of the embossing roll 16—even where these lands may occur at a joint 17 between adjacent embossing roll sections. The electrode 23 also provides a uniform force so that even lightweight extrudate may be laminated without suffering from cell-to-cell air transfer caused by the joints 17 of the embossing roll sections.

As shown in FIG. 3, the electrode 23 is preferably an elongate metal tube 25 having a plurality of outwardly extending pins 26 on an outer surface portion thereof for concentrating the electrostatic field toward the second plastic film 12. A wire 27 may be positioned within the tube 25 which electrically connects each of the plurality of pins 26 to the electrical power source 24. As shown in the illustrated embodiment, the electrode may be positioned within a protective housing 28. The housing 28 has an elongate slot 29 in parallel with the electrode 23 to permit the electrostatic field generated by the electrode 23 to press the second plastic film 12 into the first film 11. The housing 28 may also be connected to a pressurized air supply 30 for providing a slight positive pressure within the housing 28 to reduce the accumulation of smoke and other contaminants from the hot plastic films 11, 12 within the housing 28 and on the electrode 23.

The housing 28 and the electrode 23 may be mounted on a retractable mounting assembly 31 (FIGS. 1 and 2), or other mounting means. The retractable mounting assembly 31 is movable between an operating position and a retracted position as shown by the solid and dotted lines, respectively, in FIG. 2. In the operating position, the electrode 23 is positioned in a closely spaced apart relation from the embossing roll 16. In the retracted position, the electrode 23 is withdrawn from the operating position to facilitate cleaning of the electrode 23. The retractable mounting assembly 31 may include a pneumatic cylinder 32 positioned at each end of an electrode mounting bracket 33. The electrode mounting bracket 33 is pivotally secured to a pair of arms 35 at pivot points 36. The bracket 33 is locked into position by removable pins 37. The retractable assembly 31 may also include a pair of linear bearings 34 which permits further vertical positioning of the electrode 23.

In the operating position as shown in FIGS. 2 and 4, the electrode 23 is preferably positioned about 1 and ¼ inches in horizontal separation H from the tangent point on the rotating embossing roll 16 where the second film 12 contacts the first film 11. The horizontal separation from the hot plastic films 11, 12, further reduces the likelihood of contamination of the electrode 23 caused by smoke from the films. In addition, the electrode 23 is positioned at a distance v of about 1 millimeter above, or prior to, the contact point of the second film 12 with the first film 11. It has been found that this placement of the electrode 23 produces a uniform and consistent lamination between the two films 11, 12. For example, it has been found that if the electrode 23 is incorrectly positioned, wrinkling of the two films 11, 12 may be produced. If the electrode 23 is positioned too close to the embossing roll 16, electrical arcing may also occur between the electrode 23 and the embossing roll 16, or pinholes may be formed in the plastic films producing an unacceptable cellular laminate 15.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for forming a cellular plastic laminate, said apparatus comprising:
   an embossing roll having a predetermined pattern of lands and cavities formed on the outer surface thereof;
   means for rotating said embossing roll at a predetermined speed;
   first extruding means for extruding a first plastic film onto the surface of said embossing roll so that the first plastic film conforms to the pattern of lands and cavities of said embossing roll;
   second extruding means for extruding a second plastic film in superposed contacting relation with the first plastic film on the lands of said embossing roll, thereby forming a pattern of cells between the films corresponding to the pattern of cavities of said embossing roll;

an elongate electrode positioned in spaced apart relation from said embossing roll and extending substantially along the entire length of said embossing roll, said electrode adapted to be electrically connected to an electrical power supply for producing an electrostatic field of sufficient intensity to force the second plastic film into intimate contact with the first plastic film on the lands of said embossing roll to enhance the contact between the films; and a housing positioned around said electrode, said housing having an elongate opening therein parallel to said electrode and adjacent said embossing roll, said housing adapted to be connected to a pressurized air supply for providing a positive pressure within said housing to reduce accumulation of smoke and other contaminants from the hot plastic films within the housing and on said electrode;

said first and second extruding means each producing respective plastic films having sufficiently high temperatures so that the films will be fused or laminated together when forced into intimate contact on the lands of said embossing roll by said elongate electrode.

2. The apparatus according to claim 1 wherein said embossing roll comprises a plurality of lengthwise extending cylindrical sections.

3. The apparatus according to claim 1 wherein said first and second extruding means each produces respective polyethylene films.

4. The apparatus according to claim 1 wherein said elongate electrode comprises:

an elongate metal tube having a plurality of outwardly extending pins on an outer surface portion thereof for concentrating the electrostatic field toward the second plastic film; and a wire extending through said metal tube and electrically connecting each of said plurality of pins to said electrical power source.

5. The apparatus according to claim 1 further comprising means for retractably mounting said electrode; and wherein said mounting means is movable between an operating position with said electrode in a closely spaced apart relation from said embossing roll, and a retracted position with said electrode withdrawn from said operating position.

6. The apparatus according to claim 5 wherein said electrode is positioned about one inch from said roll in said operating position.

7. A method for forming a cellular plastic laminate comprising the steps of:

extruding a first plastic film onto the surface of a rotating embossing roll while conforming the first plastic film to the pattern of lands and cavities on an outer surface portion of the embossing roll;

extruding a second plastic film in superposed contacting relation with the first plastic film on the lands of the rotating embossing roll, thereby forming a pattern of cells between the films corresponding to the pattern of cavities of the rotating embossing roll;

generating an electrostatic field with an elongate electrode positioned opposite the rotating roll where the second plastic film contacts the first plastic film to force the second plastic film into intimate contact with the first plastic film on lands of the embossing roll to enhance contact between the films as the films are heat fused or laminated together; and maintaining a positive air pressure within a housing around the electrode to reduce the accumulation of smoke and other contaminants from the hot plastic films within the housing and on the electrode.

8. The method according to claim 7 further comprising the step of concentrating the electrostatic field generated by the electrode by providing a plurality of outwardly extending pins on the surface of the electrode oriented in a direction toward the second plastic film.

9. The method according to claim 7 wherein the step of extruding the first plastic film while conforming the film to the surface of the embossing roll includes the step applying a vacuum to the first plastic film at each cavity to draw the first plastic film into conformance therewith.

10. A method for forming a laminate of plastic films comprising the steps of:

extruding a first plastic film onto the surface of a rotating elongate roll;

extruding a second plastic film into superposed contacting relation with the first plastic film on the surface of the rotating roll;

generating an electrostatic field with an elongate electrode positioned opposite the rotating roll where the second plastic film contacts the first plastic film to force the second plastic film into intimate contact with the first plastic film on the surface of the roll to enhance contact between the films as the films are heat fused or laminated together; and maintaining a positive air pressure within a housing around the electrode to reduce the accumulation of smoke and other contaminants from the hot plastic films within the housing and on the electrode.

11. The method according to claim 10 further comprising the step of concentrating the electrostatic field generated by the electrode by providing a plurality of outwardly extending pins on the surface of the electrode oriented in a direction toward the second plastic film.

12. An apparatus for forming a laminate of plastic films, said apparatus comprising:

an elongate roll;

means for rotating said elongate roll at a predetermined speed;

first extruding means for extruding a first plastic film onto the surface of said roll;

second extruding means for extruding a second plastic film in superposed contacting relation with the first plastic film on the surface of said roll;

an elongate electrode positioned in spaced apart relation from said roll and extending substantially along the entire length of said roll, said electrode adapted to be electrically connected to an electrical power supply for producing an electrostatic field of sufficient intensity to force the second plastic film into intimate contact with the first plastic film on the surface of said roll to enhance the contact between the films; and a housing positioned around said electrode, said housing having an elongate opening therein parallel to said electrode and adjacent said roll, said housing adapted to be connected to a pressurized air supply for providing a positive pressure within said housing to reduce accumulation of smoke and other contaminants from the hot plastic films within the housing and on said electrode;

said first and second extruding means each producing respective plastic films having sufficiently high temperatures so that the films will be fused or laminated together when forced into intimate contact on the surface of said roll by said elongate electrode.

13. The apparatus according to claim 12 further comprising means for retractably mounting said electrode, and wherein said mounting means is movable between an operating position with said electrode in a closely spaced apart relation from said roll, and a retracted position with said electrode withdrawn from said operating position.

14. The apparatus according to claim 13 wherein said electrode is positioned about one inch from said roll in said operating position.

15. The apparatus according to claim 12 wherein said first and second extruding means each produces respective polyethylene films.

16. The apparatus according to claim 12 wherein said elongate electrode comprises:

an elongate metal tube having a plurality of outwardly extending pins on an outer surface portion thereof for concentrating the electrostatic field toward the second plastic film; and a wire extending through said metal tube and electrically connecting each of said plurality of pins to said electrical power source.

* * * * *

UNITED STATES PATENT AND TRADEMARK OFFICE
CERTIFICATE OF CORRECTION

PATENT NO. : 5,116,444
DATED : May 26, 1992
INVENTOR(S) : JOHN G. FOX

It is certified that error appears in the above-identified patent and that said Letters Patent is hereby corrected as shown below:

Column 1, line 27, delete "ether" and substitute therefor --together--.

Column 2, line 24, delete "extruding" and substitute therefor --extending--.

Column 5, line 14, delete "With" and substitute therefor --with--.

Column 5, line 34, delete "lower" and substitute therefor --power--.

UNITED STATES PATENT AND TRADEMARK OFFICE
CERTIFICATE OF CORRECTION

PATENT NO. : 5,116,444
DATED : May 26, 1992
INVENTOR(S) : JOHN G. FOX

It is certified that error appears in the above-identified patent and that said Letters Patent is hereby corrected as shown below:

Column 6, line 26, delete "1 and 1/4" and substitute therefor --1 to 1 and 1/4--.

Column 6, line 33, delete "v" and substitute therefor --V--.

Column 8, line 15, after "step" insert --of--.

Column 9, line 14, before "roll" insert --embossing--.

Signed and Sealed this

Seventh Day of September, 1993

Attest:

BRUCE LEHMAN

Attesting Officer    Commissioner of Patents and Trademarks